(12) United States Patent
Bird et al.

(10) Patent No.: US 7,599,860 B2
(45) Date of Patent: Oct. 6, 2009

(54) CUSTOMIZED SALES SOFTWARE AND IMPLEMENTATION

(75) Inventors: Terrance J. Bird, Byrn, MN (US); Evan Charles Harter, III, New York, NY (US)

(73) Assignee: Vacava Inc., Rochester, MN (US)

( * ) Notice: Subject to any disclaimer, the term of this patent is extended or adjusted under 35 U.S.C. 154(b) by 1025 days.

(21) Appl. No.: 11/107,306

(22) Filed: Apr. 15, 2005

(65) Prior Publication Data

US 2005/0234777 A1    Oct. 20, 2005

Related U.S. Application Data

(60) Provisional application No. 60/563,172, filed on Apr. 16, 2004.

(51) Int. Cl.
*G06Q 30/00* (2006.01)
(52) U.S. Cl. .......................................... 705/26; 705/37
(58) Field of Classification Search ................ 705/26, 705/37
See application file for complete search history.

(56) References Cited

U.S. PATENT DOCUMENTS 6,373,950 B1    4/2002    Rowney
7,257,597 B1 *  8/2007    Pryce et al. ................. 707/102
7,509,327 B2 *  3/2009    Joshi et al. .................. 707/100

OTHER PUBLICATIONS

Koch, Michael, Leverage legacy systems with a blend of XML, XSL, and Java; Combine XML, XSL, and Java to interface with mainframe systems, JavaWorld. San Francisco: Oct. 16, 2000. p. 1, downloaded from ProQuest on the Internet on Aug. 3, 2008, 9 pages.*
Robert L. Scheier, How will you automate your enterprise? Computerworld. Framingham: Jan. 6, 2003. vol. 37, Iss. 1; p. 18, downloaded from ProQuest on the Internet on Aug. 3, 2008, 5 pages.*
LogicLibrary and M2VP Introduce Logidex for Object Management Group's—OMG—Model Driven Architecture, Business Editors/High-Tech Writers. Business Wire. New York: Jun. 9, 2003, downloaded from ProQUest Direct on the Internet on May 10, 2009, 4 pages.*

* cited by examiner

*Primary Examiner*—James Zurita
(74) *Attorney, Agent, or Firm*—Dorsey & Whitney LLP

(57) ABSTRACT

Customized sales software for consolidating, organizing and integrating data and process flow in a manner especially suited for sales operations. The customized sales software is customized to represent the user company's business process and integrates the user company's applications and data but does not change the user company's existing applications or databases. The sales software is designed in layers to enable seamless integration of legacy systems and external data sources, without requiring change to them, while at the same time enabling the introduction of new interfaces, transactions and processes. Integration with legacy systems and external data sources is possible at different layers within the software and may or may not utilize existing legacy system applications and processes. Generally speaking, integration with legacy systems and data sources may be either one or two way or in real time, depending on the requirements of a particular business process.

6 Claims, 10 Drawing Sheets

CUSTOMIZED SALES SOFTWARE AND IMPLEMENTATION

FIELD OF THE INVENTION

This invention relates generally to customized computer software and a method for developing and implementing that software, and more specifically to software for consolidating orders and sales.

BACKGROUND OF THE INVENTION

Currently most user companies run a plurality of processes, systems, and applications. Current user company environments typically include the following sales processes and functions: quoting and ordering, customer relationship management, accounting, sales force automation, and forecasting. These various processes, through some allocation of duties and some cross-allocation of duties, take care of product pricing, user company masters, campaigns, payment history, shipping information, leads, and promotions.

BRIEF SUMMARY OF THE INVENTION

A sales application for consolidating, organizing, and integrating data and process flow, the sales application including a plurality of tiers is provided. A user interface tier communicates with a customer, and a transaction engine tier performs a plurality of sales-related processes, whereby the transaction engine manages communications to and from the user interface. A data repository tier stores sales-related data. The sales-related processes require at least a portion of the sales-related data for completion. An integration engine enables integration of the sales application with a legacy system, which stores sales-related legacy data of a third party. The sales-related processes further require at least a portion of the sales-related legacy data for completion. The sales application is integrated with the legacy system by customizing the data repository in accordance with a configuration of the legacy system and by customizing the transaction engine to conform to business requirements of the third party.

DETAILED DESCRIPTION OF THE INVENTION

Sales system and software of the present invention are provided for consolidating, organizing, and integrating data and process flow relating to sales processes and data. The sales system and software of the present invention are designed for rapid personalization and integration with existing legacy systems and other external data. The integration of another party's legacy applications and legacy data may be accomplished without modifying the party's existing applications of databases.

Tiered Architecture

The sales system and software of the present invention is designed in tiers to cater for the purposes and functions within it. These tiers enable the seamless integration of the sales system and software with a retailer's legacy systems and external data sources, without requiring change to the legacy systems or external data sources, while at the same time enabling the introduction of new interfaces, transactions and processes of the sales system and software.

Figure 1:
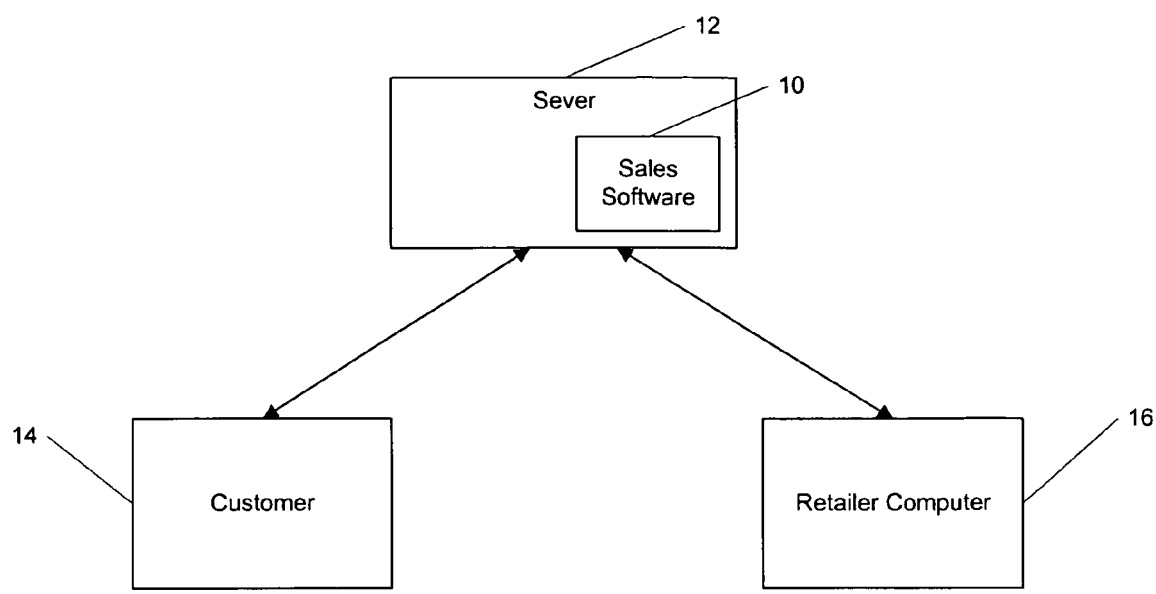
FIG. 1 illustrates the relationship between a customer, sales software, and a user company in accordance with one embodiment of the present invention.

The sales system and software enables seamless order placement by an end customer directly or via an employee at the user company or retailer. As used herein, a "retailer" may be any traditional merchant that offers products or any other entity involved with a sales-related process, such as value added resellers, distributors, original equipment manufactures, or other user companies that may benefit from the sales software described herein. The end customer may be any individual or business that receives or provides a quote, places or receives an order, or otherwise has occasion to interact with the retailer. As seen in FIG. 1, the sales software 10 is loaded on a server 12. The customer 14 and a computer 16 of the retailer or user company may access the sales software 10 from a personal computer. Two-way communication is enabled between the customer 14 computer 14 and the software 10 and between the user company computer 16 and the software 10.

Figure 2:
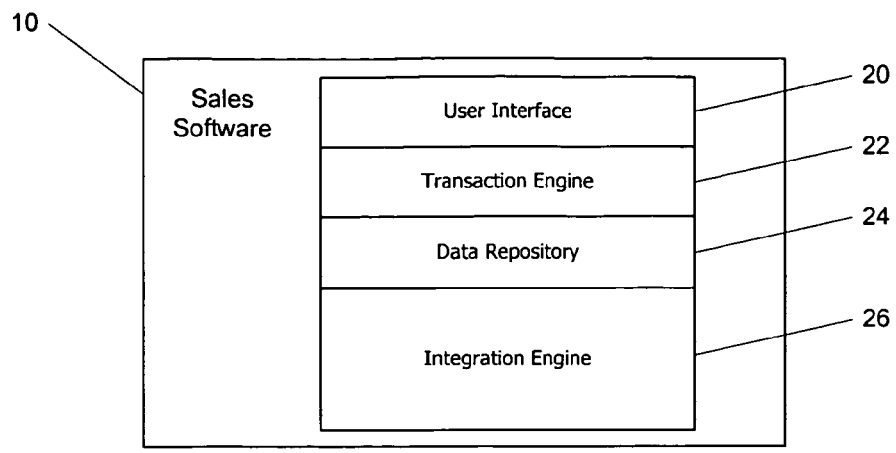
FIG. 2 illustrates the tiers of the sales software in accordance with one embodiment of the present invention.

As seen in FIG. 2, the software 10 includes four tiers or layers: a user interface 20, a transaction engine 22, a data repository 24, and an integration engine 26.

The integration engine 26 enables the communication between sales software 10 and external data sources and systems. The integration engine 26 uses a core library of components, described in more detail below, but includes the capability to connect to the external systems through fully customizable connectors and connection types.

The data repository 24 includes a core structure for the data required within the sales system processes. Data repository 24 is fully customizable by incorporating a customer's or retailer's specific requirements. Data in the repository 24 may be permanent or temporary depending on its source and process requirements.

The transaction engine 22 manages the data repository 24, triggers the integration engine 26 and controls the flow of information to and from the user interface 20. Using a core library of code to provide the flow of information to and from the user interface 20 as well as the main business processes within the sales system, the transaction engine 22 is fully customizable to each of a customer's or retailer's unique requirements.

The user interface 20 tier presents the software interfaces to a customer 14 and enables the introduction and utilization of streamlined, efficient business processes. Using a core library of code in the base sales application, user interface 20 tier is also fully customizable to each of a customer's or retailer's requirements.

Figure 3:
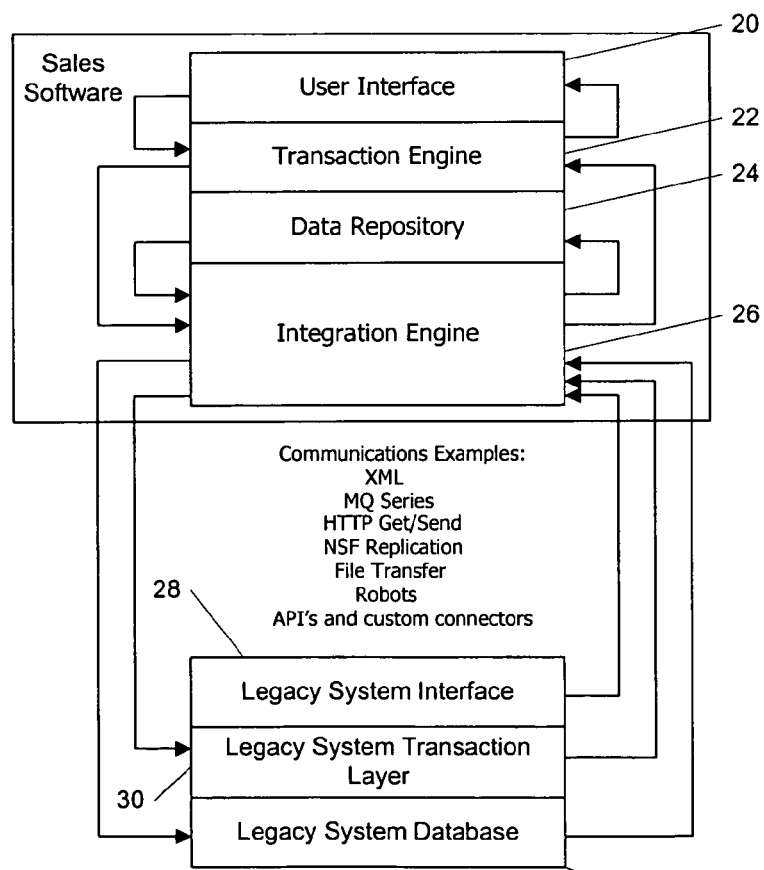
FIG. 3 illustrates the tiered structure of the sales software and the integration points with a legacy system in accordance with one embodiment of the present invention.

The tiered architecture allows for integration of sales software 10 with legacy systems and other external data sources at different tiers. FIG. 3 illustrates the tiered structure of the sales software and the integration points with a retailer's legacy system in accordance with one embodiment of the present invention. More specifically, FIG. 3 shows possible data flow between sales software 10 and a single legacy system. Retailers' legacy systems may be fully featured applications with a legacy system interface 28, legacy system transaction engines 30, and legacy system database 32, as shown, or may be a simple database or data store either internal or external to the business.

Integration of the sales software 10 with legacy systems and data sources may be either one or two way or in real time, depending on the requirements of a particular business process. In the embodiment shown in FIG. 3, two-way integration is provided between various of the layers: between the user interface 20 and the transaction engine 22; between the transaction engine 22 and the integration engine 26; and between the data repository 24 and the integration engine 26. Integration to and from the legacy system layers occurs through integration engine 26. The integration engine 26 may send data to the legacy system transaction engine 30 and the legacy system database 32. The integration engine 26 may receive data from the legacy system interface 28, the legacy system transaction engine 30, and the legacy system database 32. The sales software and system of the present invention may communicate with external legacy systems and data sources using any of various standard methods of communication. For example, as shown in FIG. 3, communication may be achieved via XML, MQ Series, HTTP get/send, NSF replication, file transfer, robots, API's, formatted text, email attachments, custom connectors or other suitable system. In addition, integration of the present invention is designed and built to allow for any other methods of communication to be employed.

Software 10 is operable with and customizable to multiple legacy systems, without practical limit on the number, either simultaneously or individually at appropriate stages throughout an integration process. As shown in the FIGS. 1 and 14, data taken from a legacy system may be fed directly to the data repository or transaction engine and may then subsequently be fed back to either a transaction process or database as appropriate. In deployment of the sales software and system, such integration is seamless to the customers as they typically interact only at the user interface 20 tier.

Figure 14:
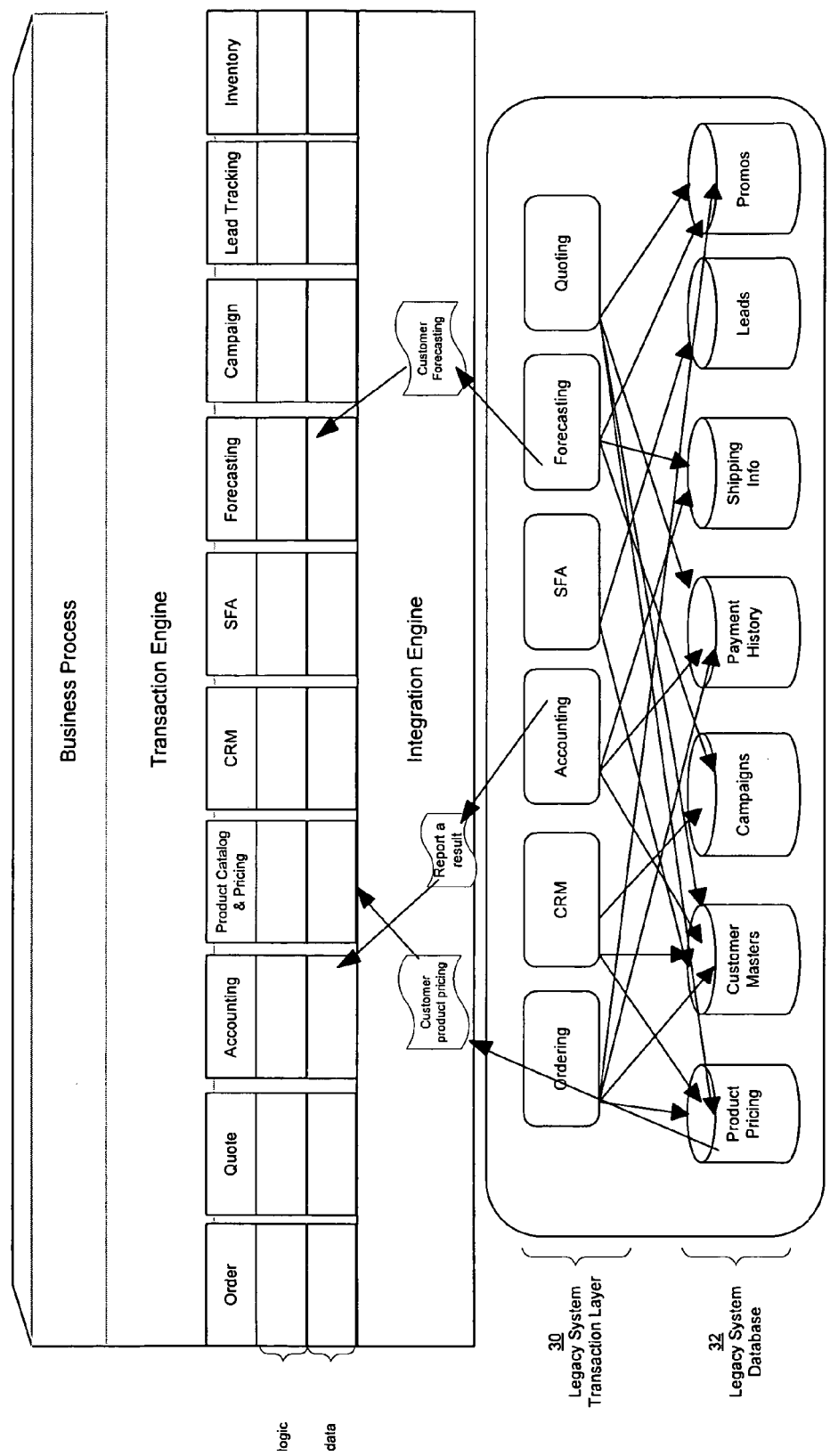
FIG. 14 illustrates a tiered architecture for the sales software in accordance with one embodiment of the present invention.

Sales software 10 draws data from retailer's legacy systems and other external data sources and processes it into it's own data repository where it may be added to with additional user entered data. With reference to FIG. 14, examples of data held in legacy systems and external sources used in a typical telesales operation as fulfilled by the software may include customer information, inventory information, discount or entitlement information, representative delegation levels, product pricing information, product detail information, product promotion information, customer credit information, quote validation information, stock level information, or ordering and fulfillment information.

On completion of a sales transaction processed by software 10, modified data is then transmitted back to the appropriate legacy systems and the original data originally obtained from such systems is disposed of. Data unique to the software 10 processes is maintained in data repository 24 for re-use as required. Where required function or data storage does not exist in legacy systems, the sales software 10 may be customized to provide such functions and data storage as described in more detail below.

During a transaction, while data is live in software 10, that data is checked and verified at process points to ensure accuracy. Where the retailer continues to use its legacy systems for at least a portion of the processing or data storage, this verification ensures accuracy across the two integrated systems. When the software 10 updates a retailer's legacy system or other external databases while the software 10 is processing a transaction, the verification may occur either directly or through interim validation systems. Validation may occurs at two points, (1) where data is brought into the application from a legacy system, where the data is checked to determine correct formats, corruption, and validity based on defined rules defined in the application, and (2) where data is sent to other systems or processes based on defined rules in the application.

Data Flow Across Tiers

Figure 4:
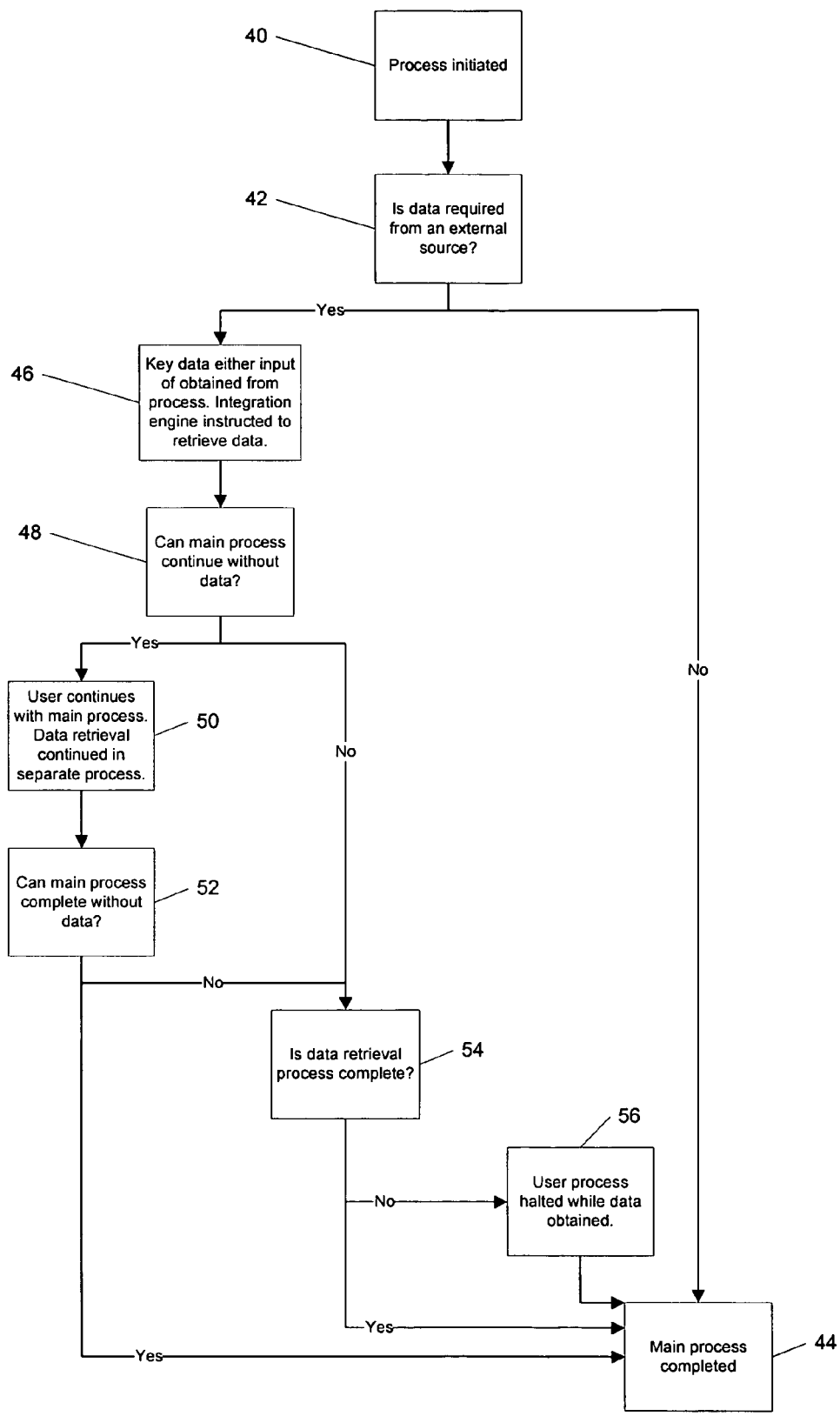
FIG. 4 illustrates a flowchart of a scenario where the user interface and transaction engine tiers are driving the integration engine in accordance with one embodiment of the present invention.

FIG. 4 is a flowchart illustrating a typical scenario where user interface 20 and transaction engine 22 drive integration engine 26. Integration engine 26 is capable of both foreground and background process integration of data from legacy and external systems. The choice of the type of integration conforms to the requirements within the retailer's process. Factors that may influence best deployment are performance factors such as the size and complexity of the data being integrated during process integration. Where the performance of the legacy system not consistent with the retailer's requirements, which is common when a legacy application is involved and data processing or searching prior to any integration, background processing may be advantageous. As seen in FIG. 4, the software maximizes the use of background integration, even in processes that may depend on data from a legacy system.

A sales process is initiated at block 40. After initiation, it is determined whether data is required from a legacy system or other external source, as shown at block 42. If no data is required from an external source, the main process is completed, as shown at block 44. If the main sales process is completed without data retrieval completed, customer 14 may be notified that the data retrieval process is completed and the data is ready for use. If data is required from an external source, key data is either input or obtained from the process, as seen at block 46. Integration engine 26 is instructed to retrieve data. The next step, illustrated at block

48, is determining whether the main process can continue without data. If the main process can continue without data, the user continues with the main process and data retrieval is continued in a separate process, as shown at block 50. It is then determined whether the main process can complete without data, as shown at block 52. If yes, the main process is completed, shown at block 44. If no, as shown at block 54, it is determined whether the data retrieval process is complete. If, at block 48, it is determined the main process cannot continue without data, the next step is whether the data retrieval process is complete, shown at block 54. If the data retrieval process is complete, the main process is complete, shown at block 44. If the data retrieval process is not complete, the user process is halted while data is obtained, as shown at block 56. After the data is obtained, the main process is completed, shown at block 44.

By way of example, the software 10 of the present invention is suitable to perform the process of building a quotation, the high level steps including (1) obtain the accurate customer details; (2) obtain any standard or special discounts that apply to the customer; (3) build a list of products to be quoted; (4) set any special terms or pricing; and (5) provide the resultant quote to the customer. In previous systems, these functions were performed in a linear fashion, even in a single system environment, such that each step must be completed before the next can be commenced. The transaction engine 22, user interface 20 and data repository of software 10 avoid such time consuming limitations by allowing processes to continue, without requiring completion of another process, where possible. For instance, during a quote build where customer 14 initiates an enquiry for all required customer data, transaction engine 22 may continue to build a list of products before the requested customer information is available. Once the customer data is available, customer 14 is notified and the relevant customer details and standard discounts set for the products is quoted.

As described in more detail, software 10 manages a variety of functions, and some of these functions require source information or data that is both internal and external to the sales software and system. Examples of such source information or data include customer information, product lists, default pricing, entitlement/discounts, product configurators, pre-installed inventory, discount delegation, promotions, clothing, or customer/product specifics. Data repository 24 is a relational database and is capable of maintaining all required data for the software to operate as a stand alone application. However, retailers frequently desire to continue utilizing their legacy systems for performing specific functions and may choose not to use the data repository 24 to hold all the required data.

For example, where a retailer selects the sales software and system of the present invention to improve efficiency of its sales operations but does not desire to change its current processes and systems used by accounts and warehousing, data repository 24 may be used as a temporary, but not permanent, data storage area for the life of a transaction. Accordingly, on a first occasion of dealing with a customer, data may be transferred into data repository 24 at various but appropriate stages within a sales process. Then throughout the life of the sales process, this data is added to with customer input data that may not reside in any other system. When the sales process is complete, for example with successful shipping of the goods and payment received, data known to have been received from other existing systems is disposed of while the new data, not previously held anywhere else is maintained. History records within data repository 24 are also populated to ensure that an accurate historical record of the customer's sales transactions is maintained. On subsequent dealings with the same customer, upon receipt of initial data from an external system, the new data and history is also retrieved thereby increasing the efficiency of interacting with the customer.

Figure 5:
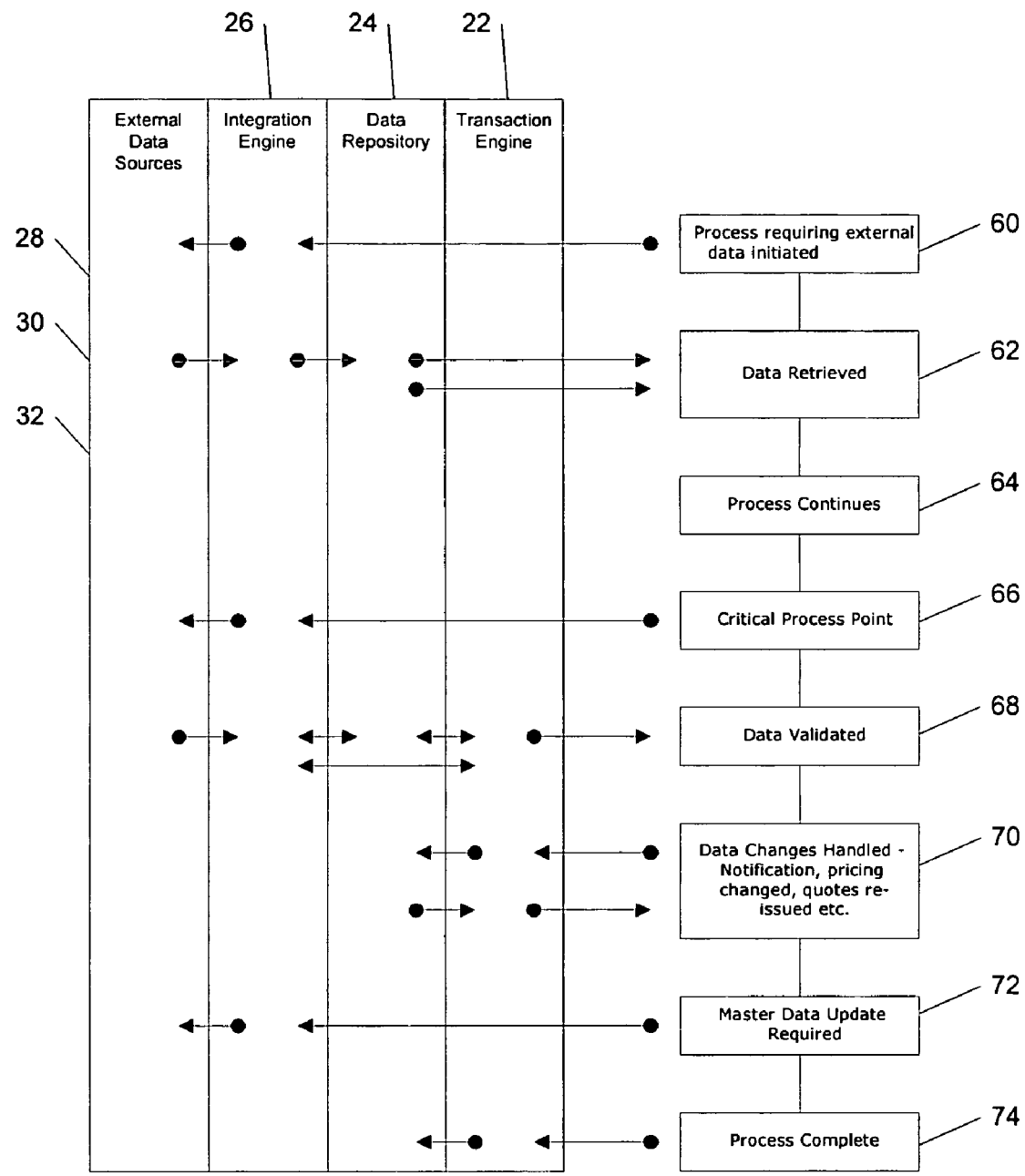
FIG. 5 illustrates a block diagram of a use of the data repository tier in accordance with one embodiment of the present invention.

FIG. 5 shows an example of possible interactions with data repository 24 in accordance with one embodiment of the present invention. A sales process is initiated at block 60, requiring external data. Integration engine 26 requests the required external data from a retailer's legacy system or other external data sources. The data is then retrieved from the external data sources to integration engine 26 and then transferred to data repository 24 at block 62. The process continues at block 64 until reaching a critical process point at block 66 where integration engine 26 again requests external data from external data sources. The external data is input into integration engine 26 where two-way data flow occurs between integration engine 26 and data repository 24 and between data repository 24 and transaction engine 22, at which point, at block 68, the data is validated. Data flows from transaction engine 22 to data repository 24 and back from data repository 24 to transaction engine 22 when, at block 70, data changes are handled and communicated, such as notification, pricing changed, or quotes reissued. A master data update is performed at block 72 when integration engine 26 requests external data from external data sources. At block 74, the process is complete, when data is input from transaction engine 22 to data repository 24.

There are several points in the sales software and system processes during which legacy systems and external data sources may be contacted by integration engine 26. For instance, during a customer enquiry, required legacy data may include customer address data (including delivery or payment addresses), customer contact data, installed inventory data, or historical and ongoing customer sales data (including discounts or past sales). During a quote build, required legacy data may product data (including prices or descriptions from multiple systems), product validation (used for configured products), current stock levels, or representative delegation levels. During a quote send preparation, required data may include re-validation of key data already acquired, re-validation of products, or current stock levels. During a quote to order conversion, required data may include re-validation of key data already acquired, re-validation of products, or current stock levels. During an order submission, required data may include re-validation of key data already acquired, re-validation of product, current stock levels, or placement of order (to multiple systems). During an order track, required data may include ERP system or external shipping agents. These operations are described in more detail herein.

Rapid Personalization

As described, the sales software and system of the present invention is operational in its native form. However, it is also readily personalized to support existing sales data and processes in a retailer's legacy systems. The rapid personalization process, which is implemented to develop and integrate the sales software 10 of the present invention, includes three general stages: consulting, modeling, and implementing. These stages may be executed by a sales software and system provider and effectively re-engineer the retailers' sales process. As used herein, "sales software and system provider" is any entity that may configure or otherwise cause software 10 to be operable with an external system.

In the consulting stage, the sales software and system provider initially consults with a retailer to collect the necessary configuration information about the retailer's existing sales systems and to define the scope of the integration process. This may involve meeting key process owners and users of the retailer's existing sales software. During the meetings, the current processes, systems, and applications are explored to determine what should be incorporated in the customized sales software. The dynamics between the process owners, systems, and applications are outlined to determine the manner in which the various components work together. Using this information, a plan is mapped for the implementation of the customized sales software. A base set of initial requirements is defined using the base application as an example The data and application owners are identified and informed of the objectives of the customized sales software, its development, and its implementation.

During the modeling stage, the sales software and system provider develops a prototype application. The sales software and system provider's existing sales software allows for rapid personalization to meet the retailer's process requirements due to various features described below. As shown in FIG. 14, the provider's existing application software includes a flexible transactional workflow engine, which drives sales software 10, with a breadth of preexisting features. Some of these features are shown in FIGS. 8-13 and are described in more detail below. The sales software 10 is sufficiently robust with functionality that it may also be implemented in a purely native form without integrating with a retailer's current environment.

FIG. 14 illustrates how components, applications, databases and existing data, and processes of the retailer's current environment legacy system are mapped and integrated with the sales software 10 in accordance with one embodiment of the present invention. The transactional workflow engine interfaces with existing processes of the retailer's legacy system, including the data and applications that drive them. For example, as shown in FIG. 1 and described in more detail below, a product pricing process may require data from a product pricing database in the legacy system and reporting a result may require an accounting process of the legacy system.

As the various elements are mapped and integrated, sales-related process improvements and control points are identified and recommended as enhancements that may yield productivity benefits and increased command over key business controls for the retailer. For example, a customer may previously implemented a manual team to verify orders submitted to a fulfillment process to ensure the order is priced properly; e.g., error or fraud checking by representative or checking to determine satisfaction all business controls defined by the customer. The sales software of the present invention can provide all the necessary checking and verification functionality, thereby increasing productivity. The resultant system represents a prototype integrated application, which is used in subsequent implementation as described in more detail below. The initial set of requirements are incorporated into the prototype and a new workflow and interface is customized and organized. Scenarios are run in the prototype that are specific to the retailer's business as outlined during the consulting stage. Training session may also be held for users and project managers, and requirements and changes critical to the working prototype are identified and documented. Changes identified are implemented into the customized sales software, which results in a tested version of the customized sales software.

Because the preexisting sales software is personalized and the retailer's existing legacy system is integrated therewith as shown in FIG. 14, the implemented system may include a substantial portion of the prototype developed in the modeling stage. For instance, the prototype may constitute 60-80% of the ultimately implemented application.

In the implementing stage the provider implements and delivers the operable sales software and system. The system reflects the retailer's critical process steps and the functions necessary to execute them as identified in the consulting stage. For reasons that will become apparent through the remaining description, the system results in improved productivity of the retailer's processes and increased control of the sales process flow. The subscription model shown in FIG. 15 further ensures such productivity and control is maintained as modifications may be continually implemented to the system that benefit the retailer.

Figure 15:
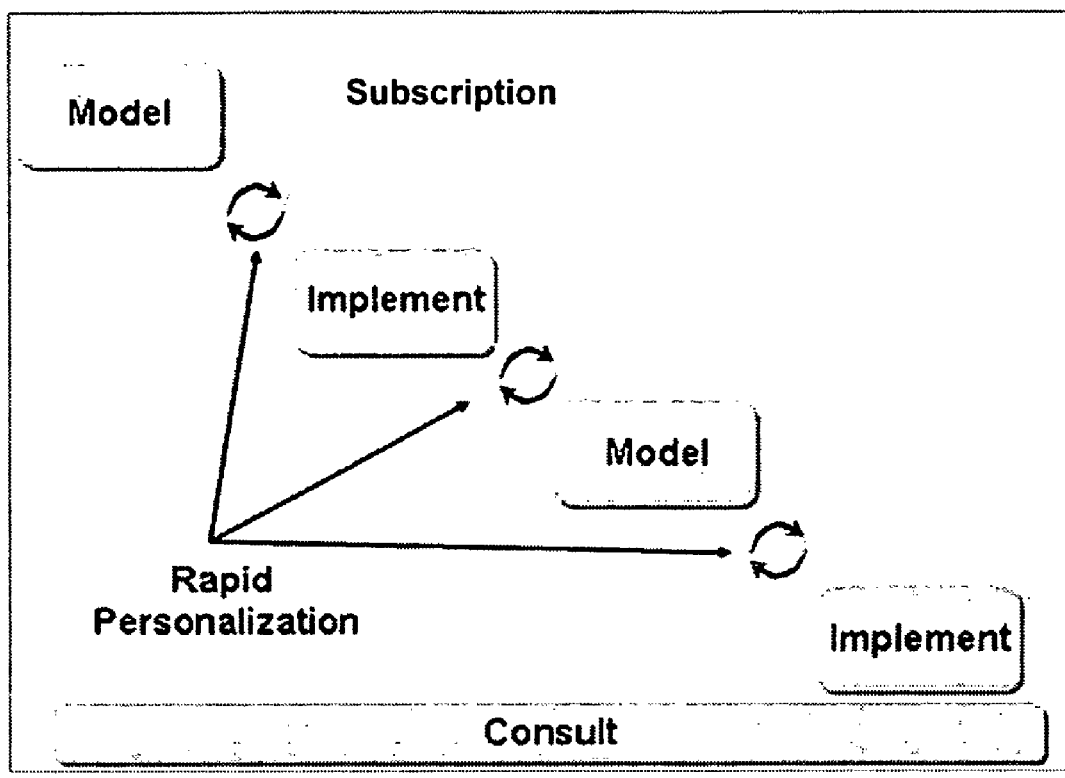
FIG. 15 illustrates a subscription model for implementing the sales software in accordance with one embodiment of the present invention.

As shown in FIG. 15, the sales software and system provider may deliver this solution in a subscription model, such that the provider and the retailer agree to a scope of the solution, for which the provider then performs and provides updates and enhancements to the application for a predetermined period of time. The updates and enhancements may include a variety of services, including process flow adjustments, new fields, other improved productivity features, and connection to other legacy databases, as part of a subscription fee without additional cost, provided that the enhancements are within the scope of the solution.

One of the aspects of the sales software 10 that allows for rapid personalization is its preexisting robust architecture and functionality. A high-level flow of process and functionality components in accordance with one embodiment of the present invention, shown in FIG. 8, where each of the components may include a variety of preexisting features and functionality that allow for rapid integration with the retailer's existing system; the features and functionality are customizable in accordance with modeling stage. These preexisting features and functionality are shown in FIGS. 9-13 and are now described in more detail. These components may reside on the transaction engine or another logical location within the sales system.

Figure 9:
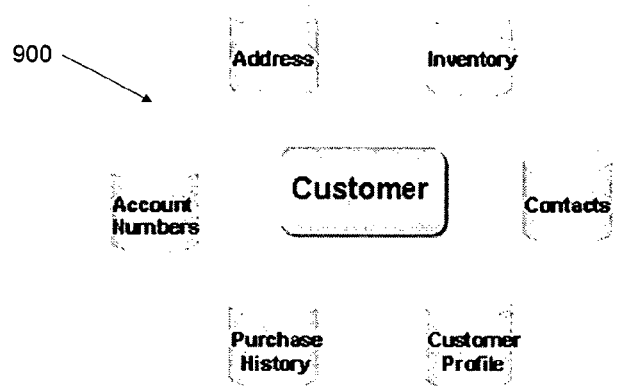
FIG. 9 illustrates a customer component relating to a customer in accordance with one embodiment of the present invention.

As shown in FIG. 9, a customer component 900 relating to a customer may contain various information relating to the customer, which is usable throughout the sales process. The customer component, also called a "super" customer record, is created during the integration stage by importing data into the sales application system from existing data available in a retailer's legacy databases or applications. If no existing legacy customer data is available, a record will be created in the sales software 10 as needed. Because these features and functionality are preexisting in the sales software 10, the system may operate with or without data from legacy systems.

The information contained in the customer component 900 shown in FIG. 9 may include the exemplary native records with corresponding data or features as listed in Table 1.

TABLE 1

| Customer Component | |
|---|---|
| Contact Information | Name |
| | Address (Business & Personal) |
| | Personal Information (Spouse, Hobbies, etc.) |
| | Created manually or automatically through the quote process |
| Customer Profile Information | Industry |
| | Sub-industry |
| | Size, revenue, etc. |
| Customer Account Numbers | Multiple account numbers may exist when process handles broad products sets |
| Customer Installed Inventory | |
| Customer Address Information | Invoice address |
| | Ship to address |
| | Enterprise/corporate address |
| Customer Purchase History | |

The information in the customer component 900 is delivered as necessary through a variety of means to the transaction engine to support the sales process as the information is required. The delivery may be automatic; for example, where then information is required to support an order or fulfillment process, it is automatically imported to an order form as the order form is transferred to the order or fulfillment process. The delivery may also be performed through active alerts; for example, when changes are made to a master customer address information. The delivery may also be performed manually by a user interacting with pull down menus on user interface 20; for example, a customer 14 may interact with a menu item, causing the item to drop down and display a list of contacts associated with a particular customer component, and the user may then select the desired contact.

Figure 10:
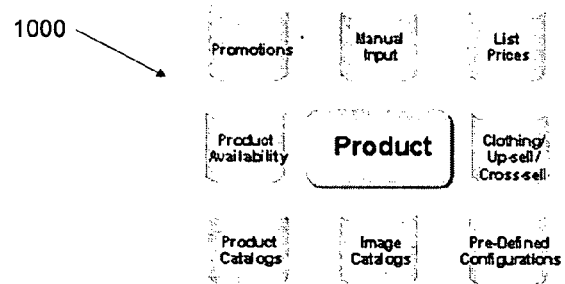
FIG. 10 illustrates a product component relating to product information in accordance with one embodiment of the present invention.

As shown in FIG. 10, a product component 1000 may contain various information relating to a product available for purchase by a user, which is usable throughout the sales process. The system provides a cross industry-solution, capable of supporting sales environments for a variety of businesses and handling multiple product types. For example, the products supported may include products delivered through catalogs. The products may also include products requiring configuration, including those that are configured inside the sales software and system 10 and products that are configured in a remote application for which a configuration file is uploaded to the integration engine 26. Some products may be put together or built in a variety of ways, in literally thousands of permutations, all of which are not valid. Configuration software may be used to configure these products based on a set of rules that define correct building of the products. These configurations or "pre-defined configurations, may be delivered to the sales software via a formatted file, such as an .xml file, or through other means. The supported products may further include products that are manually entered into the product component 1000, which may be used to handle exceptions, such as when an expected product cannot be located.

A product a product name, a part number or feature, a list price, product details or specifications, product images or pictures, product promotions, product availability, and product catalog views all may be defined in product component 1000 of the sales and system software. Product catalog views may be created by combining data from the multiple sources in order to provide the user with a complete view of a product based on the how the product has been defined.

The information contained in the product component 1000 shown in FIG. 10 may include the exemplary native records with corresponding data or features as listed in Table 2.

TABLE 2

| Product Component | |
|---|---|
| Catalog Views | Product Name |
| | Part Number/Feature Code |
| | List Price |
| | Product Details/Specifications |
| | Product Images/Pictures |
| Basic Catalog Search Capability | |
| Advanced Catalog Search Capability | Search by product category, sub-category, price |
| Promotions | Integrated in Catalog views |
| | Tools to define Promotions |
| | Automated/semi-automated discount application - rules driven, if applicable |
| Upload capability | Uploads external configurations |
| | Customization is required to map legacy configurations to provider system |
| Product Catalog Tools | Individual manual entry of products into a catalog |
| | Product catalog management |
| | Upload of external files/databases |
| Side by Side Product Comparison | Compares user-selected products |
| Email/download product information | Makes product detail and prices available to user |
| Upsell/down-sell/ cross-sell | Recommendations |
| | Automated application of products to quotes |
| | Tools to create and manage. |
| Product Availability | |

Figure 11:
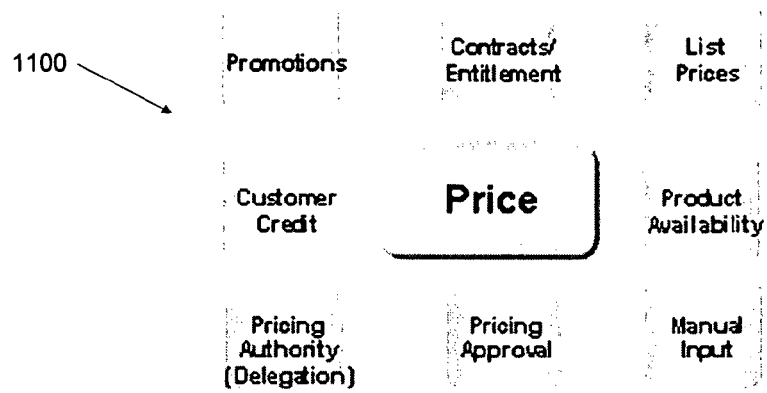
FIG. 11 illustrates a price component relating to pricing information for a product in accordance with one embodiment of the present invention.

As shown in FIG. 11, a price component 1100 may contain various information relating product pricing, which is usable throughout the sales process. The price component includes a pricing rules engine that contains customizable pricing rules. The pricing rules engine may either import data and processes from the legacy system or use the preexisting tools and data structures native to the sales software and system The information contained in the price component 1100 shown in FIG. 11 may include the exemplary native records with corresponding data or features as listed in Table 3.

TABLE 3

| Price Component | | |
|---|---|---|
| Discounting Mechanism | Percentage | |
| | Amount | |
| | Set Price | |
| | By Line item | |
| | By Group | |
| | Bottom Line Total | |
| | Special Bid Support | |
| Delegation Authority Checking | Alerts | To Sale Representative |
| | | To Management |
| | Authorization Process | |
| | Hard Stops | Quote can not be sent/printed if delegation is exceeded Discounting over authorization not permitted. |
| | Delegation Management Tools | Set Delegation (two tier) |

TABLE 3-continued

| Price Component | | |
|---|---|---|
| Rules Based Entitlement/Contract Application of Discounts | e.g., determining application of entitlements when product is on promotion | |
| Rules Based Promotion Application of Discounts | e.g., determining whether promotions are further discountable | |
| Pricing "scratch-pad" | options | Based on User Manual Save Automatic Save |
| Customer Credit "worthiness" indicator | | |
| Multiple pricing scenarios | e.g., user can build multiple, quotable scenarios e.g., scenario indicators | Different Products Different Prices Quoted Pricing Approved Pricing Not Approved |
| Single pricing scenario support | | |
| Clothing/Up-sell | Functionality for setting item as a up-sell or clothing option Automatic alert of options | e.g., maintenance alert |

These tools and data structures are implemented in operation to calculate the product price set for a customer. For example, the price component may determine the amount of discount a sales representative may give, which processes exists to approve pricing outside a sales representative's delegated authority, which promotions are available and how are discounts associated with those promotions are applied, whether a customer has a contract entitling him or her to a discount on all products or specific products, how the contract or entitled pricing operates when promotions exist on the same products, and what level of discounting is available, e.g., line item, group, bottom line, and special bids.

Figure 12:
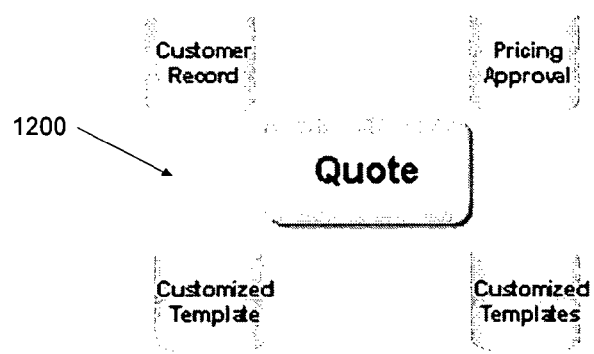
FIG. 12 illustrates a quote component relating to quote information for pricing a product in accordance with one embodiment of the present invention.

As shown in FIG. 12, a quote component 1200 may contain various information relating to developing a product quote to send to a customer. As a quote is developed for a customer, the quote component 1200 receives the necessary data from the price component 1100. Quote component 1200 may also receive support rules, including a rule to require specific conditions to be met before a quote may be sent, such as pricing approval. The specific operation of quote component 1200 may be designed during the model stage based on the retailer's requirements as assessed during the consult stage. This may include designing a quote format that is sent to the customer as a standard quote with a fixed format or a flexible format. The quote may also accord with the customer's requirements in cases where the customer expects the quote to appear in a certain format or file type. The sales and software system of the present invention includes a template creation tool that allows a user to design a quote format and populate the quote output fields as required by the retailer's customers. The provider system also includes quote preparation tools to that performs an integrity check of a quote.

The information contained in the quote component 1200 shown in FIG. 12 may include the exemplary native records with corresponding data or features as listed in Table 4.

TABLE 4

| Quote Component | | |
|---|---|---|
| Standard Quote Format | Limited Flexibility in format Removable columns format Automated addition of terms and conditions | |
| | Editable comment area | supports addition of images/pictures supports addition of URL links |
| | Automated inclusion of brochure attachments automated inclusion of URL links Email Print FAX PDF Format | |
| | HTML Format | includes order button on quote, allowing customer initiate an order from the quote |
| Customized Quotes | Template Creation Tool WYSIWYG Tool PDF Format MS XL Format MS Word Format HTML Format Email Print Fax | |

TABLE 4-continued

| Quote Component | |
|---|---|
| Quote locking based delegation | If a user exceeds an amount of discount he is authorized to approve (delegation), then the software "locks" the quote from being sent to the customer until the proper authority approves the discount. |
| Automatic contact creation | |
| Link to opportunity management - status management | Where a lead is provided by an opportunity management system to sales people, the link points to the OMS to provide a status of the lead, e.g., in process, won, lost. Leads may include a name, contact information, or product interest etc. |
| Edit quote ability | Ability to recall a quote that has been sent to a customer and edit the existing information and then re-quote with the same number, but a version identifier. |
| Quote versioning | |

Figure 13:
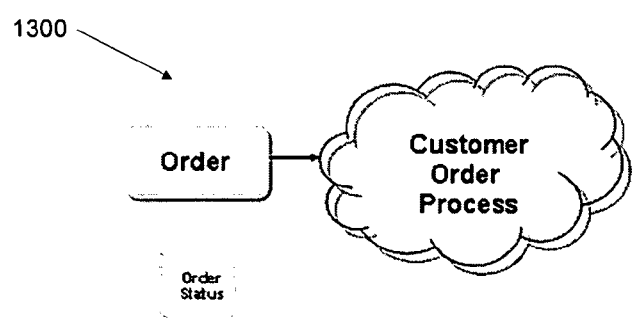
FIG. 13 illustrates an order component relating to order information for a customer's product order in accordance with one embodiment of the present invention.

As shown in FIG. 13, an order component 1300 may contain information relating to the customer's order and order status. The sales software provides a "single button" order capability, whereby a user may recall a quote and initiate an order process by selecting a single button. This functionality may provide significant productivity. Whereas typically a sale representative sends a quote out then requests an order entry tool and re-keys the information in, the "single button" order allows the quote recall to be performed automatically. The order process is unique to a customer and may be highly personalized to meet the customer requirements. Order component further 1300 supports functionality for checking and verifying the order statuses, and this functionality may be extended to customers via the Web. The order component includes the native capabilities shown in Table 5. The information contained in quote component 1200 shown in FIG. 13 may include the exemplary native records with corresponding data or features as listed in Table 5.

TABLE 5

| Order Component | |
|---|---|
| XML output of Order File | |
| Order Status Check | Performed by sales representative performed by customer via web |

Operation

Figure 6:
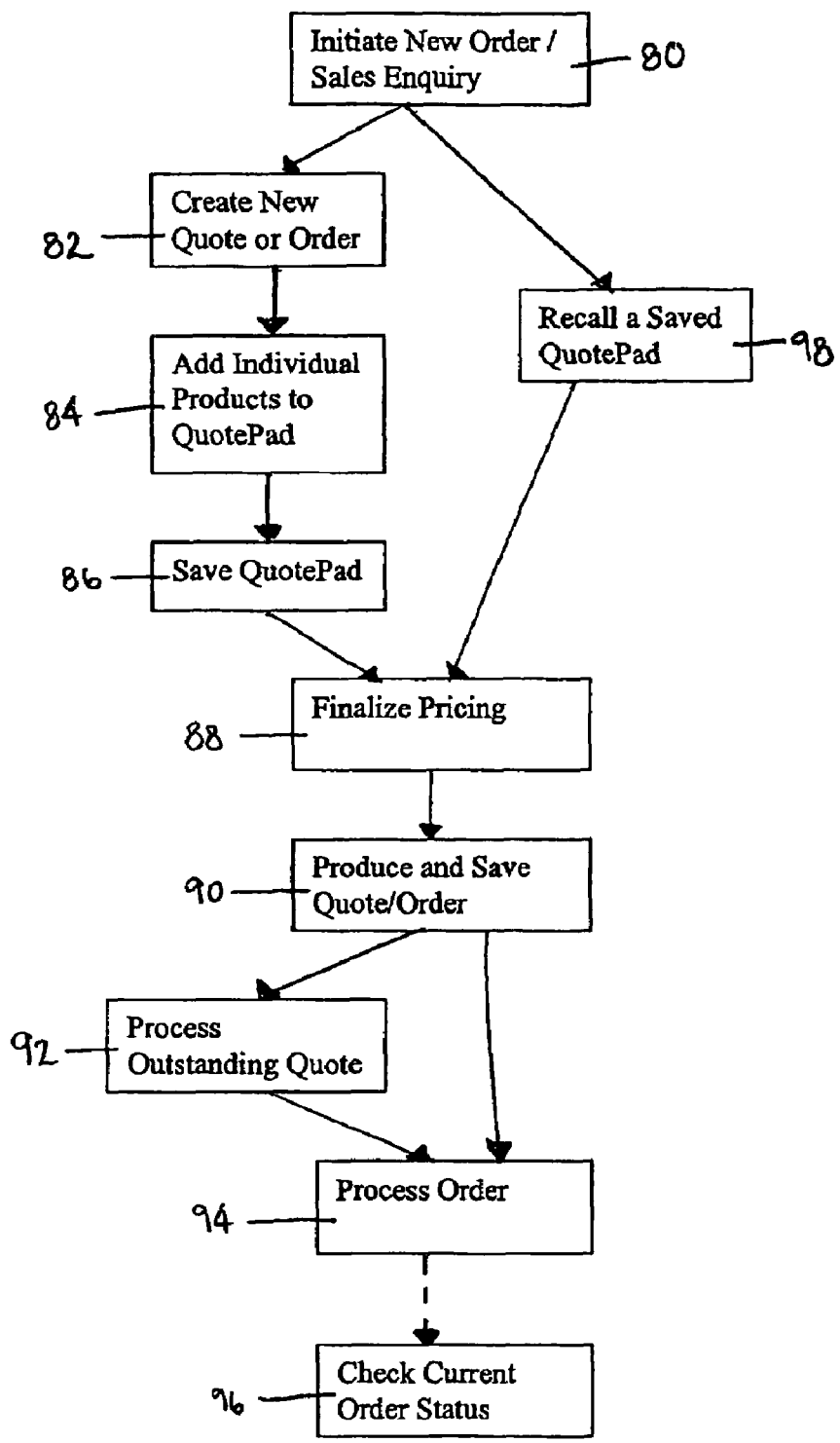
FIG. 6 illustrates a flow chart of a sales operation of the software in accordance with one embodiment of the present invention.
Figure 7:
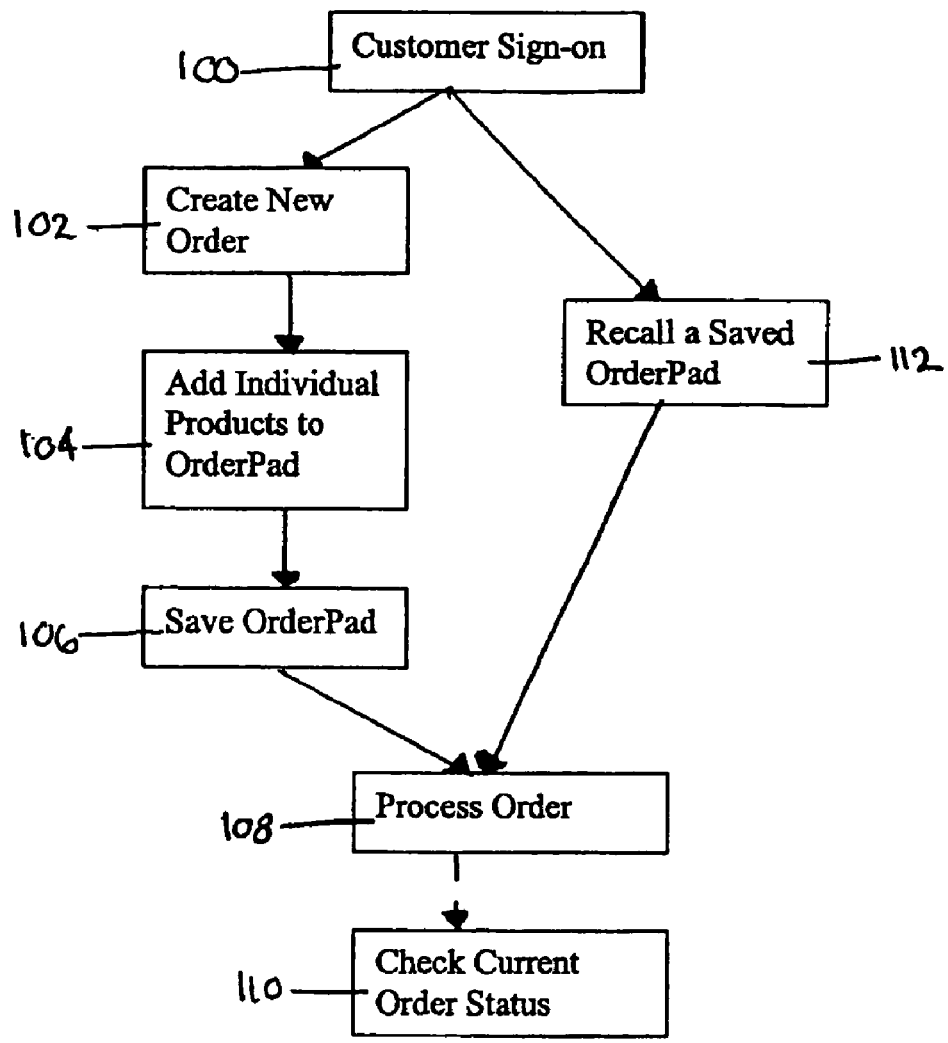
FIG. 7 illustrates a flow chart of an order operation of the software in accordance with one embodiment of the present invention.
Figure 8:
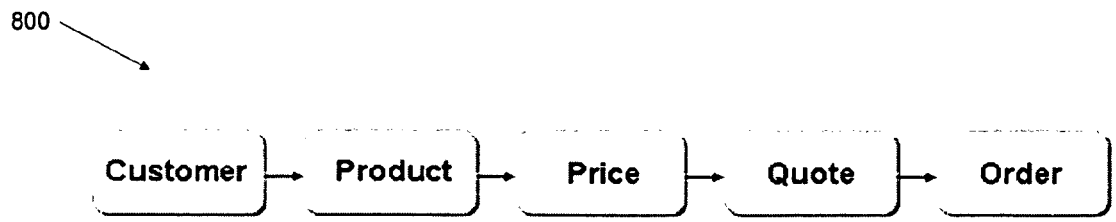
FIG. 8 illustrates a high-level flow of process and functionality components in accordance with one embodiment of the present invention.

FIGS. 6 and 7 are flowcharts detailing sales and order process flow in accordance with the sales software 10 of the present invention. As described, the sales software and system may be configured in an n-tier architecture including a client, or user interface tier, that is connected to logic and data tiers across the Internet or other network. Accordingly, a client, or user interface tier, of the sales software be launched on an Internet browser such as Internet Explorer, Netscape, or Mozilla. By launching the sales software on a browser, local client software is not needed. A user logs onto the client tier using a unique name and password such that application and user settings, permissions, and preferences are set. Because the sales software and system functionality may be provided across a global network, the system may support multiple geographical regions, currencies, and languages.

FIG. 6 illustrates a flow chart of using a sales component of the software. The sales component is typically run by an employee at the user company for developing a price quote or developing an order for a customer. The component is launched with a New Order/Sales Enquiry, as shown at block 80. The first step of the New Order/Sales Enquiry is to Select customer. This step may be performed by entering a customer Name, either new or existing. If the customer Name is an existing customer, all possible matches are displayed in a pull down menu. The correct match is selected and details are completed automatically. If the customer Name is a new name, the employee is prompted for information such as contact and business details.

After customer selection, a New Quote or Order may be created, as shown at block 82. The next step of the New Order/Sales Enquiry is to Add Products, shown at block 84. This is accomplished by creating a new quote or order. Individual products are added, for example, via catalog selection, locating products by entering keywords or part numbers, or other suitable manner. The Product is added to a QuotePad. Default discounts, promotions, and clothing are implemented in the QuotePad. The discounts may be manually adjusted to modify seller and customer discounts based on permissions and delegation authority. Further products are added until the QuotePad is completed. Additionally, or alternately, specific product configurations may be uploaded. When the specific product configuration is uploaded, product promotions and clothing are displayed. The configuration may then be added to the QuotePad, where, again, default discounts, promotions, and clothing are implemented and may be manually adjusted. When the QuotePad is complete, it may be saved, shown at block 86, for future recall. Such saving may save all product details on the QuotePad, enabling rapid quoting/ordering of "standard" or common products. Thus, the invention also provides for using a saved quote/order by recalling the saved QuotePad, shown at block 98.

The pricing for the order is finalized, shown at block 88, after all products have been added to the QuotePad. Finalizing the pricing may be done by adjusting pricing/discounting on individual QuotePad lines. This may be done by applying a discount, applying a line price, or checking items against delegation levels. Alternately, pricing may be finalized by adjusting pricing/discounting on all lines simultaneously. This may be done by applying the same discount to all lines or setting a total quote/order price, wherein pricing is calculated and set per line to attempt to stay within user delegation levels. As a step in finalizing the pricing, discount approval is required if the pricing or discount is over the delegation level on any individual line. At that point, the quote/order is blocked until approval is granted.

After the pricing has been finalized, the quote/order is produced, shown at block 90. This may be performed from the QuotePad. The QuotePad includes custom graphics based on the products quoted and included custom web links based on the products quoted. The quote may be further customized by adding additional web links, setting up sections to be quoted, or adding custom notes/text. Once the quote details are finalized, the quote is distributed, for example by print or email. The Quote may be saved automatically for future reference.

To handle existing quotes and process an outstanding quote, shown at block 92, the existing quote is retrieved using the customer's name, the quote number, or other suitable information. If appropriate, the quote is amended by removing products, adding new products, and/or adjusting pricing and discounting. If amended, the quote is reissued and an incremental quote number may be assigned.

To process an order, shown at block 94, the order summary details are completed. This may be performed directly after producing and saving the quote/order, at block 90, or may be done after processing an outstanding quote, at block 92. This entails confirming or amending details such as contacts (purchaser, shipping, billing) and addresses (shipping, billing), entering order specific data such as customer order number and delivery instructions and, optionally, process payment via a credit card or other payment mechanism. A confirmation receipt may be processed. Typically, a matching order number is assigned to the quote for easy reference.

To check the status of a current order, shown at block 96, the order may be called up using the order number or other suitable information. The internal order status, shipping details, shipping tracking, invoiced status, and similar order details may then be checked.

FIG. 7 illustrates a flow chart of using an order component of the sales software, shown in FIG. 14. The order component is typically run by a customer for placing an order and is designed for easy customer use. For placing a new order, a customer signs onto the system, shown at block 100. If the customer is a registered customer, the customer does not need to enter customer details as these are recognized from the sign on. If the customer is not a registered customer, the customer will have to enter customer details. To create an order, shown at block 102, the customer may add individual products, shown at block 104. This may be accomplished via catalog selection, entering product keywords or part numbers. The customer may compare products. In one embodiment, the customer may compare up to three products in side by side compare view. Product promotions and clothing are displayed for each product selected. If selected for purchase, the product is added to OrderPad. Default discounts, promotions, and clothing are displayed corresponding to the product. Further products may be added to the OrderPad until the order is complete. During product selection, product configurations may be uploaded to the customer. At any point, the OrderPad may be saved for future recall, shown at block 106. Saving the OrderPad saves all product details on the OrderPad for future recall, enabling rapid ordering of standard or common parts. The saved OrderPad may be used by the customer at any future point. Thus, the invention also provides for using a saved order by recalling the saved OrderPad, shown at block 112.

To process the order, shown at block 108, the order summary details are completed. This include confirming or amending details such as contacts (purchaser, shipping, billing) and addresses (shipping, billing). Order specific data is entered such as customer order number and delivery instructions, and the payment may be processed, for example, when using a credit card. An order number is assigned. Current Order Status may be checked, shown at block 110, by calling up the order using the order number or other information. Shipping details, shipping tracking, invoiced status, and similar details may then be checked.

Using the sales component and the order component, at various stages in the processes of adding products for quoting and/or ordering, various software processes are invoked; for example, customer default detailing and seller default discounting may be applied. Default discounts may be based on standard discounting or uplift models, based on individual products or on product groups, specialized industry/product specific discount models, conditional discounts (for example, buy one of a first product and one of a second product and receive 10% off of both), or other appropriate discounts. Applicable promotions may be identified and full details made available to the user based on individual products or product patterns (for example, buy one of a first product and one of a second product and this promotion applies). Product clothing opportunities may be identified and suitable products automatically added. This may include individual products or product patterns (working in conjunction with promotions).

Although the present invention is described with reference to specific proposed embodiments, persons skilled in the art will recognize that changes may be made in form and detail without departing from the spirit and scope of the present invention.

What is claimed is:

1. A computer-implemented method for integrating data and process flow of a sales system with a legacy system of a third party, the method comprising:
    determining a configuration of the legacy system, including identifying legacy sales processes performed by the legacy system and legacy sales databases stored on the legacy system;
    mapping preexisting sales applications of the sales system for performing predefined sales-related functionality and preexisting sales databases of the sales system to the legacy system based on the configuration of the legacy system, including identifying a subset of the legacy sales processes to replace with preexisting sales applications and identifying a subset of the legacy sales databases to replace with preexisting sales databases; and
    replacing the subset of the legacy sales processes with the preexisting sales applications and the subset of the legacy sales databases with the preexisting sales databases, wherein data is communicated between the preexisting sales databases and the legacy sales databases.

2. The computer-implemented method of claim 1 further comprising the step of customizing the sales databases of the sales system and a transaction engine of the sales system to accommodate the configuration of the legacy system.

3. The computer-implemented method of claim 1, wherein the step of mapping further includes logically connecting sales-related data of the sales system to the legacy system based on the configuration of the legacy system, wherein the sales-related data of the sales system includes customer data, product data, and price data.

4. The computer-implemented method of claim 1, wherein the step of mapping further includes logically connecting the preexisting sales databases to sales-related legacy data stored on the legacy system based on the configuration of the legacy system, wherein the sales-related legacy data includes customer data, product data, and price data.

5. The computer-implemented method of claim 1 further comprising the step of customizing the predefined sales-related functionality based on the configuration of the legacy system.

6. The computer-implemented method of claim 1 further comprising the step of customizing the sales databases of the sales system by modifying data structures therein based on the configuration of the legacy system.

* * * * *